United States Patent [19]
Collins et al.

[11] Patent Number: 5,657,607
[45] Date of Patent: Aug. 19, 1997

[54] THERMALLY INSULATING GLASS PANEL AND METHOD OF CONSTRUCTION

[75] Inventors: Richard Edward Collins, Riverstone; Stephen James Robinson, Newtown, both of Australia

[73] Assignee: University of Sydney, Sydney, Australia

[21] Appl. No.: 526,536

[22] Filed: Sep. 11, 1995

Related U.S. Application Data

[63] Continuation of Ser. No. 835,424, filed as PCT/AU90/00364, Aug. 21, 1990.

[30]  Foreign Application Priority Data

Aug. 23, 1989 [AU] Australia ................... PJ5931
Dec. 1, 1989 [AU] Australia ................... PJ7702
Mar. 8, 1990 [AU] Australia ................... PJ9013

[51] Int. Cl.$^6$ ........................................ E04C 2/34
[52] U.S. Cl. .......................... 52/786.13; 428/34
[58] Field of Search ................. 52/786.1, 786.13, 52/171.3, 172; 428/34; 156/99, 104, 107, 109

[56]  References Cited

U.S. PATENT DOCUMENTS

| | | |
|---|---|---|
| 1,370,974 | 3/1921 | Kirlin . |
| 2,198,578 | 4/1940 | Hazelton, Jr. et al. . |
| 2,749,579 | 6/1956 | Shaw . |
| 2,896,272 | 7/1959 | Latenser . |
| 3,027,607 | 4/1962 | Badger et al. . |
| 3,472,640 | 10/1969 | Stockdale . |
| 3,778,126 | 12/1973 | Wilson . |
| 3,778,127 | 12/1973 | Langston, Jr. et al. . |
| 3,914,000 | 10/1975 | Beckerman et al. . |
| 3,947,260 | 3/1976 | Salisbury . |
| 3,961,871 | 6/1976 | Kurio . |
| 3,990,201 | 11/1976 | Falbel . |
| 4,038,797 | 8/1977 | Hermann et al. . |
| 4,125,390 | 11/1978 | Kawai et al. . |
| 4,169,985 | 10/1979 | Ernsthausen et al. ........ 428/34 |
| 4,184,480 | 1/1980 | Kenny . |
| 4,186,723 | 2/1980 | Coppola et al. . |
| 4,312,457 | 1/1982 | Allaire . |
| 4,359,042 | 11/1982 | Belentepe et al. . |
| 4,393,105 | 7/1983 | Kreisman . |
| 4,683,154 | 7/1987 | Benson et al. . |
| 4,786,344 | 11/1988 | Beuther . |

FOREIGN PATENT DOCUMENTS

| | | |
|---|---|---|
| 27065/88 | 6/1989 | Australia . |
| 0 047 725 A1 | 9/1981 | European Pat. Off. . |
| 921 946 | 5/1947 | France . |
| 1 154 921 | 4/1958 | France . |
| 2 294 315 | 12/1974 | France . |
| 200585 | 10/1938 | Switzerland . |
| 588 0008 | 5/1977 | Switzerland . |
| 1 251 592 | 10/1971 | United Kingdom . |
| PCT/CH86/00166 | 6/1987 | WIPO . |

*Primary Examiner*—Michael Safavi
*Attorney, Agent, or Firm*—Shefte, Pinckney & Sawyer

[57]  ABSTRACT

A thermally insulating glass panel comprises two spaced apart sheets of glass enclosing a low pressure space and interconnected by a peripheral joint of fused solder glass and an array of support pillars, and a pump-out tube used to provide communication between the low pressure space and the exterior of the panel during the creation of the low pressure space. The support pillars each comprise a preformed core of a selected geometry and a selected material and a coating of solder glass at least in the areas between the preformed core and the sheet glass. Preferably the preformed core is spherically shaped and completely coated by solder glass. The preformed core serves to separate the glass sheets during the heating process of the panel's fabrication when the solder glass is in its molten state, and the solder glass serves as a mechanical joint to support the glass sheets after solidification. Furthermore, to increase the strength of the mechanical joint, a thin film of solder glass may be placed in the vicinity of the support pillars on the glass sheets, thereby increasing the wetted area of the solder glass coating of the support pillar.

27 Claims, 8 Drawing Sheets

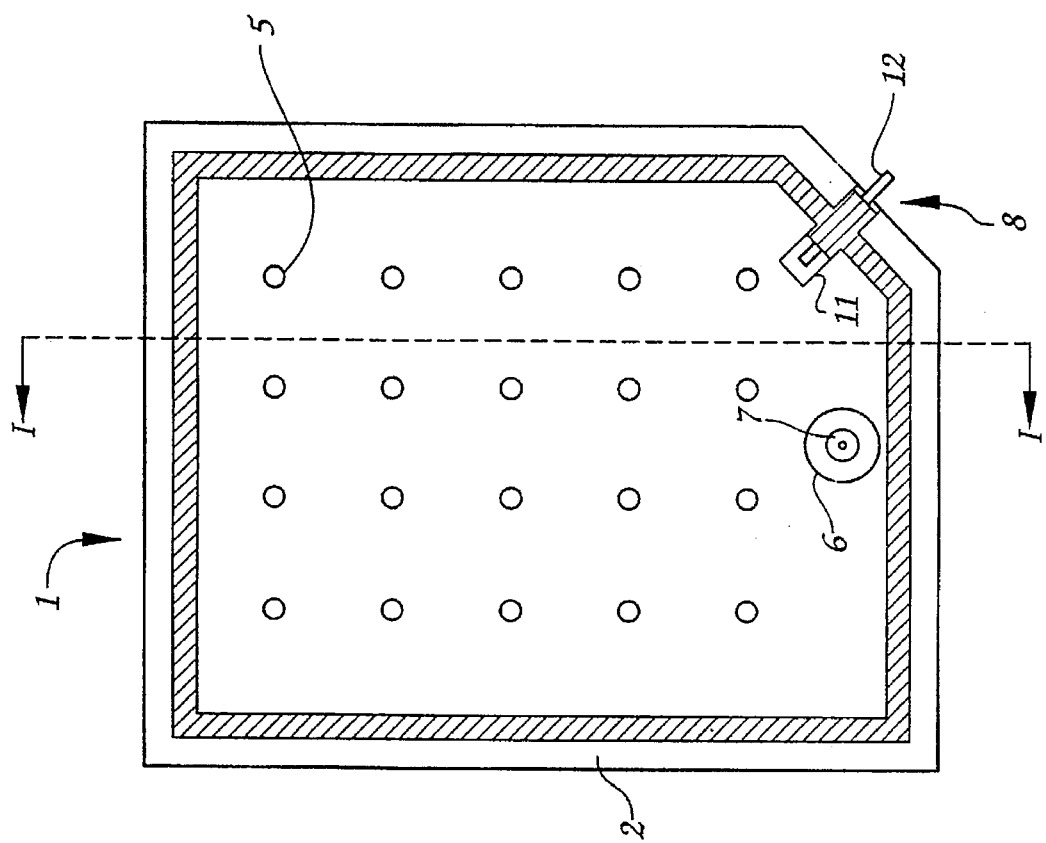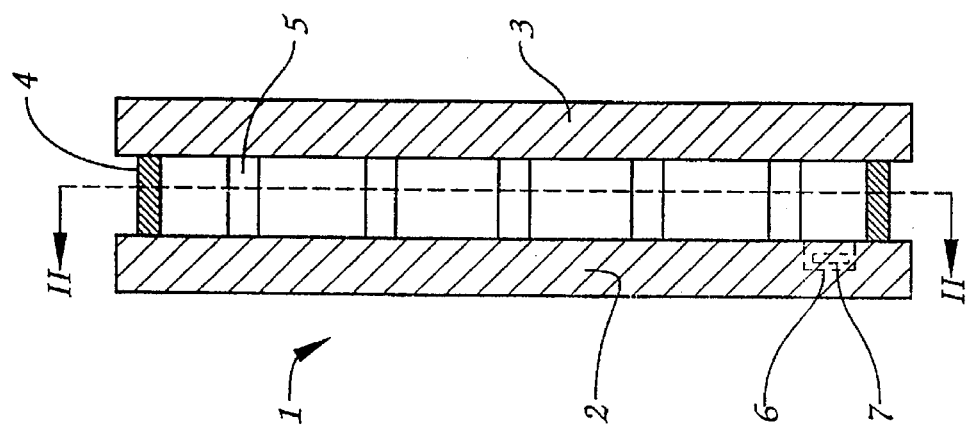

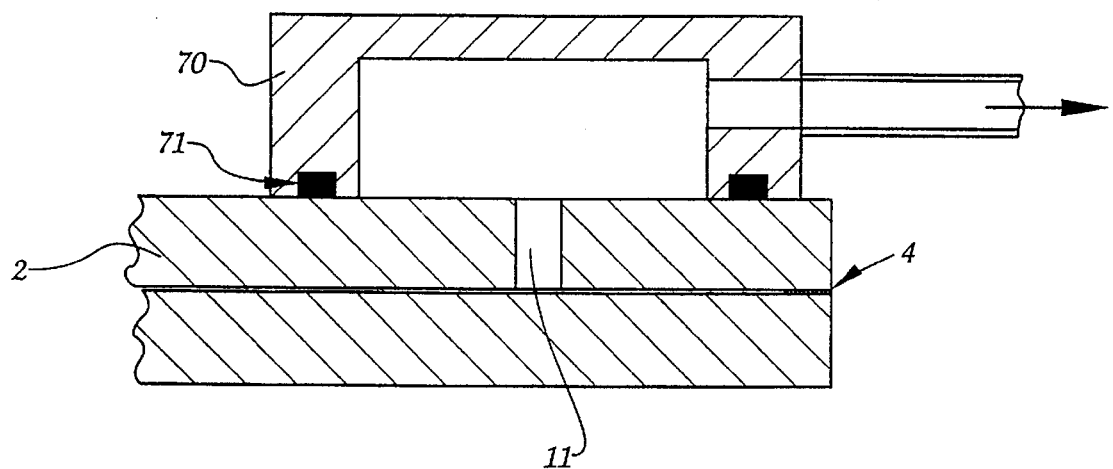
Fig. 11
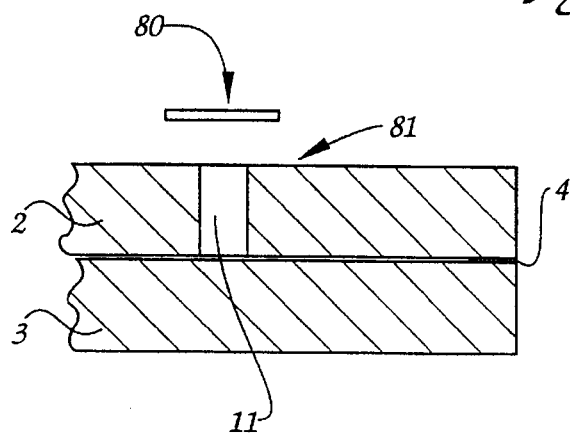 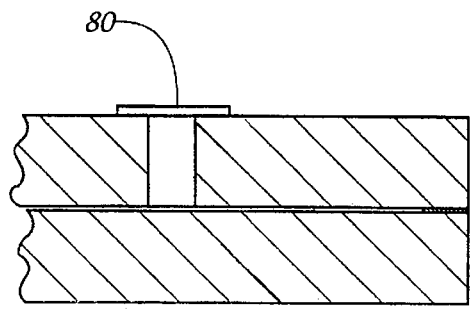
Fig. 12A    Fig. 12B
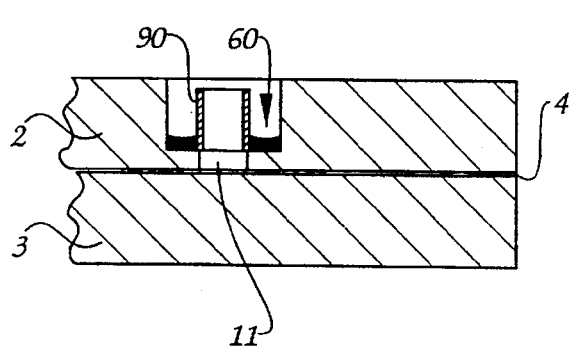 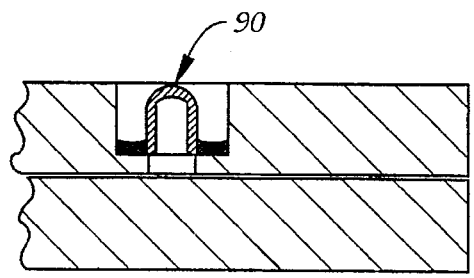
Fig. 13A    Fig. 13B

THERMALLY INSULATING GLASS PANEL AND METHOD OF CONSTRUCTION This application is a continuation of U.S. patent application Ser. No. 07/835,424, filed as PCT/AU90/00364, Aug. 21, 1990.

TECHNICAL FIELD

This invention concerns a thermally insulating glass panel and, in a second aspect, a method of construction for such a panel. More particularly, the invention concerns evacuated glass panels suitable for windows.

Buildings lose and gain heat principally because air is continually entering and leaving them, and because heat is conducted and radiated through glass windows. The amount of heat radiating through a window, in either direction, can be reduced by depositing special coatings onto the glass. The amount of heat that is conducted through glass is not normally limited by the thermal conductivity of the glass itself, but by the rate with which heat is transported to the glass surface. Heat is transported from within the building to a window surfaces by the convection of air, resulting from thermally generated buoyancy forces; this is a relatively inefficient process of heat transfer. Outside the building either free convection, or forced convection resulting from wind, dominates the heat transport process. In order to reduce significantly the amount of heat conducted through windows it is necessary to increase the thermal impedance of the window structure itself (i.e. reduce its thermal conductance) by about two orders of magnitude.

BACKGROUND ART

Double or multiple sheets of glass separated by a gas space exhibit a substantially lower thermal conductance than a single sheet of glass. The thickness of the gas space must be large enough to reduce the amount of heat conducted through the gas, but small enough to prevent convection currents from being set up. The gas space may be partially evacuated to inhibit convection, but very low pressures must be reached if conduction is to be inhibited.

There are several difficulties to address in the design and production of very low pressure evacuated windows: for instance, to achieve a very low level of vacuum and maintain it over a long period of time, it is necessary to make a seal around the perimeter of the window using materials which have extremely low permeability to gases and negligible outgassing over long periods of time. Normal gasket sealing materials such as rubbers and adhesives are not suitable.

In addition, an array of supports must be provided between the sheets of glass to ensure sufficient mechanical strength to withstand the forces imposed by atmospheric pressure. These supports lead to localized concentrations of mechanical stress in the glass, and in the supports themselves, which increases the danger of breakage resulting in hazardous implosions. Furthermore, the mechanical supports lead to an increase in thermal conduction through the window.

Glass itself contains dissolved gases which may be emitted into the evacuated space over long periods of time. It is therefore necessary for the structure of the window to be heated to high temperatures while it is being evacuated, to eliminate any gas dissolved within the glass. But, at high temperatures glass is significantly weaker than at room temperature. This limits the temperatures which may be used, and consequently increases the time required, to eliminate the gases dissolved in the glass.

DISCLOSURE OF THE INVENTION

According to a first aspect of the present invention, there is provided a thermally insulating glass panel, comprising:
two spaced apart sheets of glass enclosing a low pressure space and interconnected by a peripheral joint of fused solder glass and an array of pillars having an exterior coating of fused solder glass.

Preferably, the pillars each comprise a preform made of glass, ceramic, metal or other material completely coated with a layer of solder glass before it is fused. Alternatively the pillars may comprise a preform with solder glass caps at the top and the bottom only.

Advantageously, the preform should be made from the same material as the glass sheets in order that the thermal expansion coefficients of the preforms, the sheets and the solder glass should match.

Preferably pump out means, which have been used to provide communication between the low pressure space and the exterior of the panel during the creation of the low pressure space, are incorporated into the panel.

The pump-out means may comprise a pump-out tube which must be attached to the panel in such a way as to ensure that the join between them is hermetic, that is totally leak free, and capable of withstanding the bake-out temperatures necessary to remove dissolved gases from within the glass panels. Typically, these temperatures are between 200° and 300° C.

It is also highly desirable for the pump-out tube, in the finished panel, not to protrude from the panel in such a way that renders it liable to be broken off.

The pump-out tube may pass through a hole extending in the panel between the low pressure space and the exterior. Advantageously the tube is embedded in solder glass in a channel extending through the peripheral joint, and made up from two parts, e.g. half, channels each of which is made in a respective sheet of glass.

Alternatively, the pump-out tube may be positioned at the exterior end of a hole extending in the panel between the low pressure space and the exterior, and be attached by solder glass. Advantageously the hole passes from the interior face of one sheet to an edge of that sheet. Alternatively the hole comprise a gap in the peripheral joint of fused solder glass.

In another alternative, the tube is sealed to a hole which passes from an interior face of one sheet of glass to an exterior face. Advantageously the hole passes from the interior face of the sheet to the bottom of a recess in the exterior face of the sheet, so that the tube can be melted and sealed leaving a stub which does not protrude beyond the plane of the exterior face.

In another arrangement, one of the sheets of glass has a portion of its edge removed to provide a recess in the exterior of the finished panel to accommodate the tube. Alternatively a portion of the edges of one or both sheets of glass is bevelled to provide the recess. In any event the tube is embedded in solder glass in the recess.

In another, preferred, arrangement the pump-out tube is positioned at a corner of the panel, and the apex of the corner is removed to accommodate the stub of the pump-out tube, and ensure that it does not protrude beyond the nominal dimensions of the panel.

In an alternative embodiment the pump-out means comprises a hole which passes from the interior face of one of the sheets of glass to exterior face of that sheet, or the bottom of the recess in the exterior face.

After the panel has been evacuated the tube is sealed (tipped off), or the hole is capped. The hole may be capped in any one of a number of different ways, for instance sealing it with a metal or metalised glass cap soldered onto a pre-metallised area around the hole.

It is also preferred to include a chemical getter within the panel.

It is desirable to include a low emittance coating on the interior surface of one or both sheets of glass. The emittance of the coatings should be between 0.05 to 0.2 to ensure a thermal conductance due to radiation of approximately 0.15 to 0.6 $Wm^{-2}K^{-1}$ or less.

The preferred separation of the glass sheets in an evacuated window is in the range 0.01 mm top 1.0 mm. The dimensions of this space can be controlled by choosing preforms of appropriate thickness within the solder glass support pillars. Several possibilities exist for such preforms including discs or spheres made of glass or metal. Glass spheres of these sizes are readily available.

The internal pressure of the panel should be below $10^{-2}$ torr and preferably below $10^{-3}$ torr. This is necessary because the thermal conductivity of gases is virtually independent of pressure until the pressure is reduced to an extent where the mean-free path for molecule-molecule collisions is comparable with the dimension over which the heat is to flow. At lower pressures, thermal conduction becomes proportional to pressure and decreases to zero at zero gas pressure. The thermal conductance due to the air at a pressure of $10^{-3}$ torr is of the order of 0.05 $Wm^{-2}K^{-1}$, although the exact gas molecules and the surfaces within the window. (The heat transport due to convection reduces to a negligible level at pressures of around 1 torr.)

According to a second aspect of the present invention there is provided a method of constructing a thermally insulating glass panel comprising two spaced apart sheets of glass enclosing a low pressure space interconnected by a peripheral joint of fused solder and an array of pillars, the method including the steps of:

(a) depositing a strip of solder glass around the periphery of the sheets;

(b) depositing an array of pillars onto one of the sheets of glass, each pillars comprising a volume of solder glass containing a preform of higher melting point material;

(c) brings the glass sheets together and heating the panel to melt the solder glass of the pillars;

(d) moving the glass sheets together, or permitting them to move together, when the solder glass is molten until the sheets come into contact with the preforms; and then (e) cooling the panel to solidify the solder glass.

Advantageously, the volume of solder glass is well-defined and the preforms have a comparatively small volume in relation to the pillar. Preferably the preforms have dimensions much less than the lateral dimensions of the pillars. The preforms serve to define the height of the pillars only; the lateral dimensions are determined by the volume of material deposited at each pillar location. After evacuation, the force due to atmospheric pressure is borne by the solder glass pillar, and the preform plays a relatively small part in the mechanical strength of the pillar.

The preforms are preferably glass spheres, although other shapes are possible such as ellipses, cylinders or prisms.

It will be appreciated that, for large sheets of glass, the tolerance on planarity may not be such that contact would normally be achieved for all pillars over the entire surface area. However, if the temperature at which the fusion joint is made is sufficiently high, a very small amount of deformation of the glass sheets occurs. The temperature and time of the heating process may be chosen to be such that this deformation is just sufficient to ensure contact with each preform, but insufficient to cause major deflections which would result in contact of the glass sheets between the pillars. Other techniques which, although not so convenient, would ensure contact at every pillar include application of force above each pillar during the fusion cycle, or producing a very slight pressure reduction within the evacuated window during this cycle. In the latter method, the sheets are forced into contact with the preforms by the pressure difference between the outside, and the inside of the panel.

Preferably, the method according to the present invention involves the step of depositing a comparatively thin layer of solder glass over the surface of the sheet in the vicinity of the pillars before the step of depositing the array of pillars. In this way, the area of glass around the base of each pillar will be free from imperfections after the panel has been constructed. This will make the glass much stronger around the base of the pillars.

A pump-out tube may be positioned in the solder glass sealing material around the periphery, and gas may be pumped out through this tube while the panel is kept hot, to reduce the internal pressure of the panel to $10^{-2}$ torr or less. After the pressure has been reduced to this level, the pump-out tube is advantageously fused to seal it.

If desired, the panel may be surrounded by a low pressure region while the interior is evacuated; this reduces the pressure differential acting on the glass sheets while they are hot and have reduced strength.

Preferably, a recess is machined into the interior surface of one of the glass sheets, and a chemical getter is installed within the recess before the sheets are sealed together. The getter may than be fired by externally applied RF heating after the panel has been assembled. Alternatively a getter which is thermally activated at temperatures which occur during bakeout may be used.

Optionally, a low emittance coating may be applied to the interior surfaces of one or both sheets of glass.

BRIEF DESCRIPTION OF THE DRAWINGS

The invention will now be described by way of example only with reference to the accompanying drawings, in which:

FIG. 1 is a sectional view of a panel embodying the present invention;

FIG. 2 is a sectional view taken on the line II-II of FIG. 1;

FIG. 5 is a graph indicating the relationship between pillar separation $\lambda$ and pillar radius a;

FIG. 11 is a fragmentary sectional view of another embodiment of the present invention;

FIGS. 12a and 12b are fragmentary sectional views of another embodiment of the present invention, open and sealed respectively; and FIGS. 13a and 13b are fragmentary sectional views of another embodiment of the present invention, open and sealed respectively.

BEST MODES FOR CARRYING OUT THE INVENTION

Figure 3:
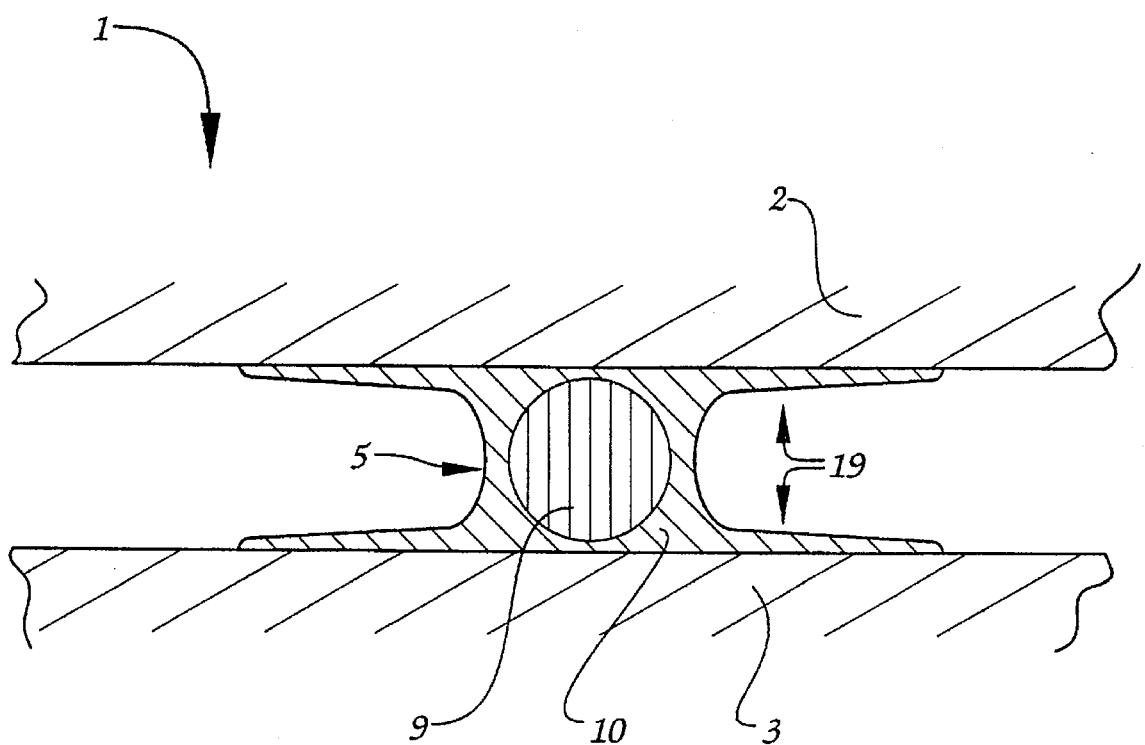
FIG. 3 is a sectional view of part of the panel of FIG. 1 including a section through a pillar.

Referring now to FIGS. 1 and 2, panel 1 comprises two spaced apart glass sheets 2 and 3. The sheets are interconnected by a peripheral joint 4 of fused solder glass, and by an array of pillars 5. One of the sheets has a machined recess 6 for a chemical getter 7. A pump-out means 8 is positioned at the periphery of the panel.

Any type of glass may be used, including soda lime glass, the least expensive used for glazing. The quality and thickness of the glass are matters of choice, however, the glass must be flat enough for the support pillars 5 to contact both sheets substantially uniformly over the whole area of the panel. Otherwise, large stresses may arise in regions which are not supported, and sheets 2 and 3 may even contact each other between the pillars, which will result in increased heat losses.

The pillars 5 have a glass, ceramic, metal or other material core 9 completely coated with solder glass 10; see FIG. 3. The core 9 may be cylindrical, elliptical, spherical, or any other convenient shape. The surfaces of the pillars are fused during the fabrication process and form mechanical joints between the pillars 5 and the glass sheets 2 and 3.

Pump out means 8 comprises a channel 11 made up of two half channels 11' machined into respective mating surfaces of the two glass sheets. A glass tube 12 is sealed into this channel using solder glass; the same material as is used to produce the hermetic edge seal 4 around the window, and at least the exterior of the support pillars 5. See FIG. 4.

After the space in the interior of the panel has been evacuated part of tube 12 close to the panel is heated until it melts and is then sealed (tipped-off). It can be seen, in FIGS. 2 and 4, that the tube protrudes from a corner 13 of panel 1 and that the apex of this corner has been cut off. The reason for this is so that once the tube has been tipped-off it does not extend beyond the nominal dimensions of the panel. This means that when the panel is housed in a rectangular frame the tube 12 will not protrude sufficiently far that it can be damaged by the frame, and is protected by the frame. The stub of the pump-out tube may be encapsulated or otherwise protected prior to mounting in the frame, in order to facilitate handling without damage.

A preferred method of fabricating a thermally insulating, two sheet, glass panel embodying the present invention will now be described.

First, a cavity 6 for the getter 7 is machined into the inner surface of one or both sheets of glass. This may be done by drilling or any other convenient method.

A channel must also be formed for the pump-out tube assembly 8. In FIG. 2, a corner of both glass sheets has been removed, and a cylindrical channel 11 has been drilled into the glass sheets, extending beyond the area of the solder glass seal 4. The channel 11 may be formed in one sheet only, if desired.

The glass sheets are then cleaned thoroughly. The quality of final vacuum in the window depends critically on the level of cleanliness achieved at this stage. The cleaning operation may involve simply washing in water, detergent or solvent. Ultrasonic cleaning methods, or acid etching techniques may also be employed. Abrasive based techniques should be avoided, however, as the glass will be significantly weakened if the surface is damaged. Following cleaning, the glass is rinsed and dried.

A low emittance coating is then deposited on the inner surfaces of one or both sheets of glass. These coatings should have reasonable optical transparency, low infra-red emittance, and be compatible with the level of vacuum in the finished panel and the high temperatures employed during the fabrication process. Such coatings include Indium tin oxide, tin oxide, and very thin metal films. The coating may consist of single layers or multiple layer stacks.

The solder glass sealing material is then deposited around the periphery of at least one of the sheets, and the support pillars are deposited on the glass. Solder glass is also applied to the outside surface of the pump-out tube 12, and in the surface of channel 11.

Solder glass, also referred to as glass frit is a standard sealing material in the electronics industry. The material consists of a mixture of oxides which possesses a melting point lower than that of normal glass, and which has a thermal expansion coefficient which is so close to that of normal glass that a relatively stress-free joint can be made. Solder glasses are available in two broad types, those which remain vitreous after firing and those which undergo a crystalline transition during the firing process. Glass which remain vitreous can be heated and melted several times, but crystalline glasses can be heated and melted only once; they subsequently go through a phase transition after which they possess a much higher melting point.

Solder glass is supplied in the form of fine powder which is mixed with liquid to form a thick slurry for deposition. Many liquids are suitable including water and organic solvents. In some procedures an organic binder, such as nitrocellulose, is dissolved in the solvent (often amyl acetate) and this material serves to make the glass powder more adhesive before it is melted. The binder decomposes at high temperatures. Solder glass is also available in the form of flexible sheets which may be cut to size and be positioned as desired on the glass. The solder glass may be pre-fired before assembly of the window, if desired.

Each pillar 5 comprises a well-defined volume of solder glass 13, coating a glass sphere 14. During manufacture, each pillar is deposited onto the surface of one of the glass sheets. Commercially available microdispensing equipment is available to perform this task accurately. Following deposition, the pillar assembly may be prefired to remove any solvent or binder in the solder glass.

The entire window consisting of two glass plates, support pillars, pump-out tube, and getter is then assembled and hermatically sealed together. This operation involves, raising the temperature of the window to a working temperature, holding it at that temperature for a certain specified time and then cooling. This fuses the solder glass joint around the periphery of the panel and over the exterior surfaces of the pillars. During the fusing operation, the solder glass makes a strong bond to both glass panels. Satisfactory seals have been made with solder glass manufactured by Schott under type no. 8467 and soda lime glass panels. The two glass sheets move towards each other whilst the solder glass is molten but this motion ceases when the sheets come into contact with the glass spheres within the pillars. Since it is possible to manufacture glass spheres to quite close tolerance, very accurate control can be achieved on the separation of the glass sheets.

Most importantly, after the sealing operation the surfaces of the pillars and the glass sheets under, and close to, the pillars are mechanically flaw-free, since they consist of freshly solidified glass which has not been damaged by any handling operation. The pillars are thus very strong and will withstand high stresses before breaking. In addition, a mechanically sound joint is established between the pillars and the glass plates. This ensures that stresses in the pillars are spread uniformly at the pillar/plate interface, and minimises the risk of fracture in or near the pillars.

To achieve even greater levels of tensile stress close to the pillars, the solder glass in contact with the glass sheets is caused to extend some distance beyond the diametrical dimension of each support pillar. This will normally occur to a certain extend due to the natural tendency of the solder glass to wet the glass sheets at high temperature, and therefore to spread laterally away from the pillar. In order to increase the extent of the wetted region, thin coatings of solder glass 19 are applied to both sheets of glass 2 and 3 and in the vicinity of pillars 5; see FIG. 3. These coatings are sufficiently thick to form a continuous film of solder glass on the glass adjacent to the pillar, but thin enough so that the sheets do not contact beyond the nominal dimensions of the pillars. Subsequent to the deposition of the thin film of solder glass, each pillar 5 is deposited in the normal way.

The purpose of the thin film of solder glass is to fill any small surface imperfections or flaws in the immediate vicinity of the pillar. After the firing operation, the freshly solidified film of solder glass will be completely free from flaws having solidified from the liquid, and will not be subject to mechanical damage in any way. In this way, very high strength flaw free glass close to the support pillars can be produced.

During the evacuation procedures, the panel assembly is heated and pumping lowers the internal pressure. Pumping produces a high level of vacuum within the window, typically well below $10^{-3}$ torr. Following the heating cycle, the assembly is cooled and the pump-out tube is sealed off by melting and fusing it. The remaining stub of the pump-out tube is sufficiently short that it does not protrude beyond the nominal overall dimensions of the window or, in other words, such that it does not protrude beyond an imaginary rectangle which frames the complete window. The fragile stub can be protected by a suitable encapsulation technique.

The entire panel may be enclosed in a partially evacuated second chamber during the heating and pumping process to reduce the hydrostatic pressure forces acting on panel. Enclosing the assembly in a low pressure environment allows higher temperatures to be employed and reduces the processing time. The second chamber does not, of course, have to employ a pressure as low as that intended to be created within the panel.

Apart from the hermetic seal around the periphery of the window, and the removal of dissolved gases from surfaces within the system during the pump out, it is also desirable to include some form of continuous pumping within the window. This is usually achieved by the use of a "getter". A getter is highly reactive material, such as barium or aluminium, which is evaporated onto the inside surfaces of the glass sheets, usually after sealing is complete.

In one type of getter, the reactive material is typically provided in the form of a ring consisting of an outer sheath, which encapsulates the reactive material. The ring 7 is mounted inside the cavity 6 on supports, and is heated from outside the window using a radio frequency (r.f.) induction technique. At high temperatures, the reactive material diffuses through the sheath, evaporates and is deposited on the cold walls of the vessel. In this condition, it provides the necessary pumping to maintain high vacuum. The supports are designed so that they do not couple effectively to the r.f. power, and only a small amount of heat flows through them to the cold glass plates during the short period when the getter is hot.

In an alternative type of getter, the reactive material is activated by the temperature of the bakeout operation during the evacuation process. This type of getter does not require a separate heating operation.

In the design process for an insulating evacuated panel the separation and dimensions of the pillars are determined by many factors including: the mechanical strength of the pillars and the glass sheets in the vicinity of the pillars; the design value of heat transport through the pillars; the thickness of the glass sheets; the maximum allowable bending stress, and bending deflection of the glass sheets; the desire to minimise the internal volume of the panel to avoid hazards in the event of a breakage; and the desirability of being able to exhaust the gas from within the panel in a reasonable time.

In order to control the mechanical and thermal properties of an evacuated panel, it is therefore necessary to control the dimensions of the support pillars.

If a given volume, V, of solder glass including the volume of preforms 14 is deposited onto the surface of the sheet, then the radius, r, of pillar 5 formed will be dependent upon the separation, h, of glass sheets according to the relationship;

$$\pi r^2 h = V \text{ for cylindrical pillars.}$$

It follows that the dimensions of the pillars are determined by the volume of solder glass dispensed.

One of the limiting factors in the performance of an evacuated panel is the mechanical strength of the glass sheets and the support pillars. There is substantial magnification of the stresses due to atmospheric pressure because of the very small total pillar area compared with the panel area. In fact, there is advantage in making the pillars as small as possible in order to reduce heat flow through the pillars and to minimise their visual impact. In addition, the pillars should be as close together as possible in order to minimise the deflection of the glass sheets and the bending stresses in these sheets.

The mechanical stresses in the glass sheets close to a support pillar have been extensively studied. Immediately beneath the pillars, the glass is under compressive stress. Adjacent to the pillars, the surface of the glass experiences radially tensile stress. The tensile stress at the surface of the glass sheet for points outside the contact area is given by:

$$S = \frac{(1 - 2\mu)}{2\pi r^2} F$$

where F is the applied force on the pillar, $\mu$ is Poisson's Ratio for glass, and r is the distance from the axis of the pillar.

The region of tensile stress is of particular concern in the design of a pillar array. It is well known that glass failure occurs in regions of tensile stress. For a spherical indenter, and for the support pillars in an evacuated panel, such failure results in a conical stress fracture around the edge of the contact region. Glass failure is believed to initiate from an imperfection within a region of tensile stress and to propagate from that imperfection into the rest of the solid.

For a square array of pillars of separation $\lambda$, the force of each pillar $F=q\lambda^2$, where q is the atmospheric pressure ($10^5$Pa). The maximum tensile stress which occurs adjacent to the pillar is therefore $$S(a) = \frac{(1-2\mu)q}{2\pi} \left(\frac{\lambda}{a}\right)^2 = 10^4 \left(\frac{\lambda}{a}\right)^2 \text{ Pa}$$

If $S_{max}$ is the maximum tensile stress that can be safely applied, $$\lambda \leq 10^{-2} \, a \, S_{max} \quad (1)$$

A second relationship between the pillar separation and pillar radius can be derived from the heat flow through the pillars. For very short pillars the thermal conductance of a single pillar is 2 Ka WK$^{-1}$. For a square array of pillars separated by $\lambda$, the total thermal conductance of the pillar array is $C_{pillars}=2$ Ka/$\lambda^2$ Wm$^{-2}$K$^{-1}$. If $C_{pillars\ max}$ is the maximum design value of pillar conductance for the window, we derive $$C_{pillars,\ max} \geq 2 \, Ka/\lambda^2$$

For glass (K=0.78 WM$^{-2}$K$^{-1}$), $$\lambda \geq \sqrt{40 \, a/C_{pillars\ max}} \quad \text{where } \lambda \text{ and } a \text{ are in mm} \quad (2)$$

These two relationships between pillar separation and pillar radius enable dimensions to be derived for the size of pillars that can be used, and the separation between them.

Figure 5:
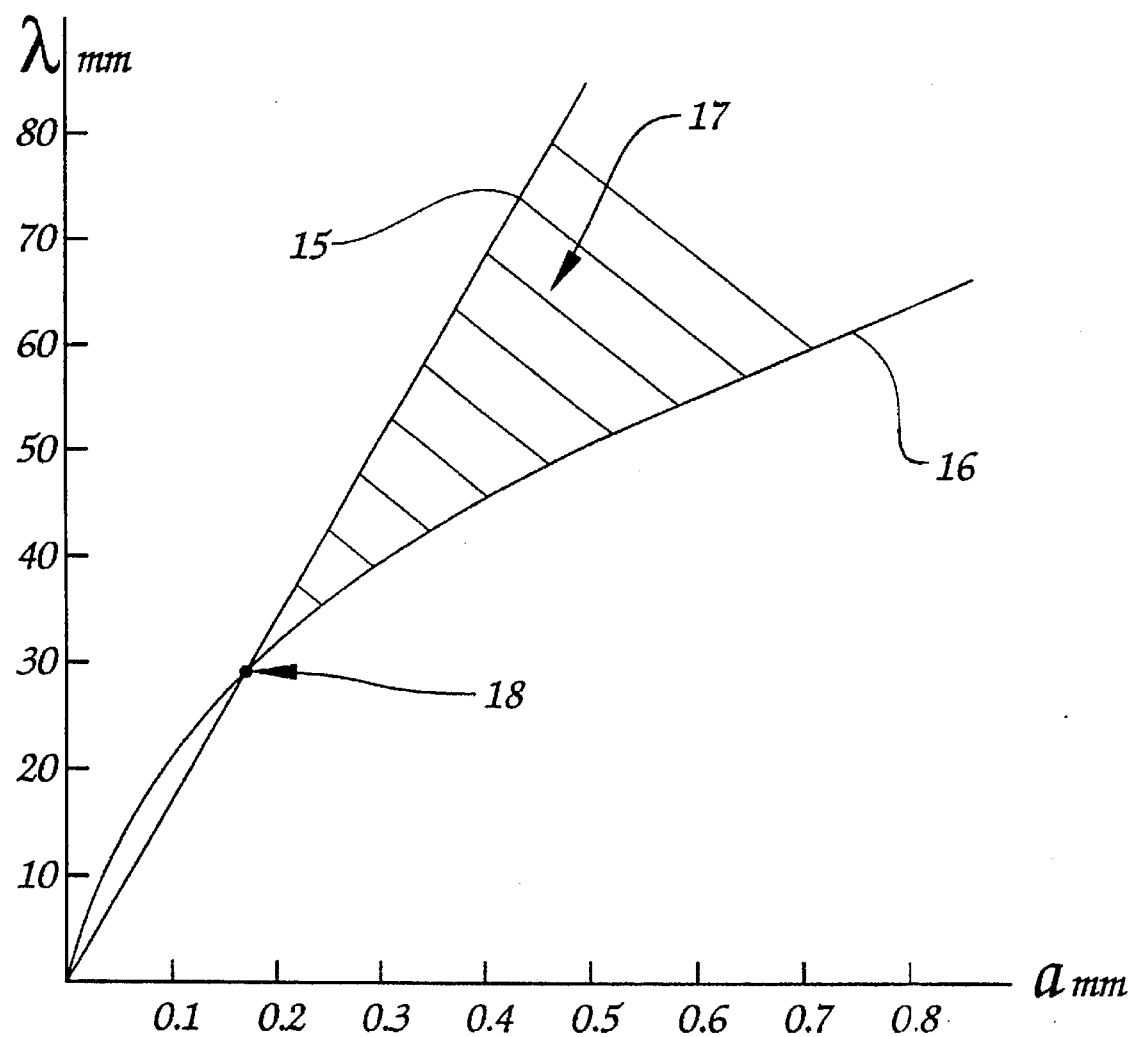

By way of example, if $$C_{pillars,\ max}=0.3 \text{ Wm}^{-2}\text{K}^{-1} \text{ and } S_{max}=3\times10^8 \text{ Pa,}$$

then lines 15 and 16 of FIG. 5 show the equality in the two relationships (1) and (2) respectively between $\lambda$ and a, and the shaded area 17 indicates the region of values of $\lambda$ and a for which the maximum tensile stress in the glass, and thermal conductance of the pillar array are less than the specified values. The minimum separation and radius for the pillars are approximately 30 mm and 0.2 mm respectively; as indicated at point 18. Other values are possible within the range indicated. However, as stated, the minimum value of separation will normally be chosen in order to reduce stresses elsewhere in the structure. For comparison, if $S_{max}=$ $1\times10^8$ Pa, the minimum values of pillar separation and radius are approximately 50 mm and 0.5 mm respectively.

The preceding analysis demonstrates the importance of achieving very high strength in the glass sheets close to the pillars. The method of construction of the support pillars has been shown to result in very high strength. For example, tensile stress levels in excess of $3\times10^8$ Pa have been observed adjacent to pillars constructed as described above without failure. This stress is considerably greater than that observed in normal window glass in air, as measured by a spherical indenter. One reason for the high strength observed may be due to the previous high temperature cycle which should anneal out small surface imperfections. A second reason could be the absence of water vapour which is known to assist in the propagation of stress-induced fractures. A third reason may be that the mechanical structures used in which the solder glass eliminates surface imperfections in the glass sheet close to the pillars, results in very high strength values.

While the invention has been described with reference to a particular example, it should be appreciated that it may be embodied in may other forms. For instance, the deposition of the low emittance coating, the deposition of the solder glass, and the formation of the array of support pillars may be carried out in any other convenient order.

Figure 6A:
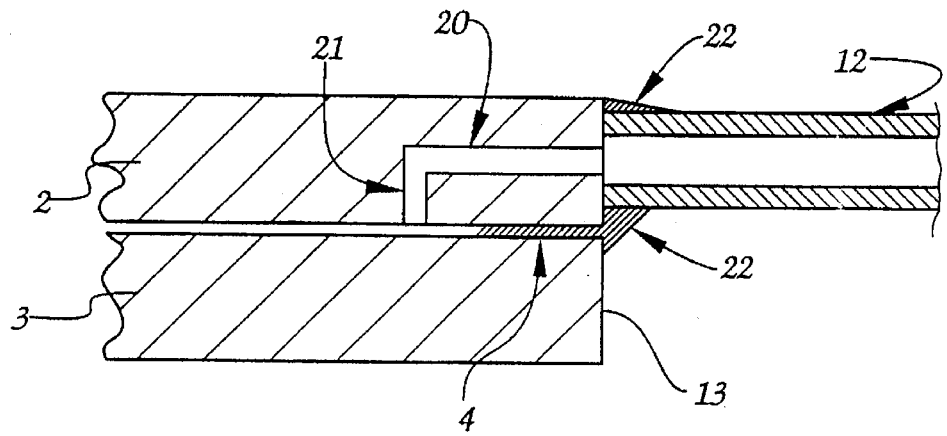
FIGS. 6a, 6b and 6c are fragmentary sectional views showing alternative embodiments of the present invention.

Also the pump out means may be configured in a number of other ways, such as shown in FIG. 6a. The apex of corner 13 is again cut away as in FIG. 4. A small hole 20 is machined (drilled) into the cut edge of one of the glass sheets 2 for a distance greater than the width of the edge seal 4 between the sheets. Another hole 21 is drilled from the interior face of the glass to meet with this hole, in order to provide a connection for pumping from the interior of the panel to the exterior. The glass tube 12 is attached to the edge of the panel by solder glass 22 where the hole emerges. After tip-off of pump-out tube 12 the remaining stub does not protrude beyond the nominal dimensions of the panel. The advantage of this arrangement is that the two mating faces of the glass sheets remain flat thereby ensuring a good seal between the solder glass around the periphery of the panels. In a variant shown in FIGS. 6a and 6c, the hole in the edge of the glass sheet 2 can be made to be a good fit for pump-out tube 12. This helps to ensure a leak-free join between the pump-out tube and the glass.

Figure 7A:
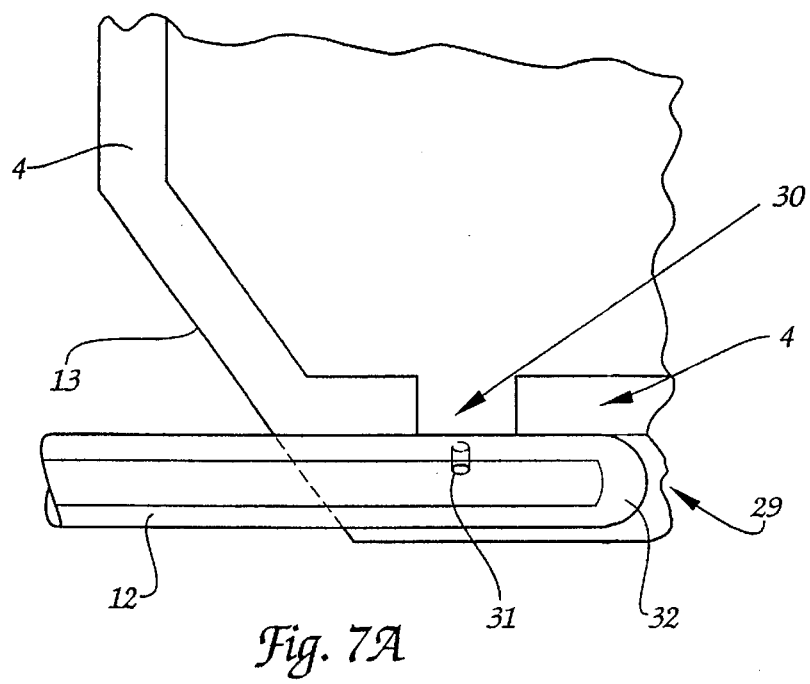
FIGS. 7a, 7b and 7c are a fragmentary plan two elevational views of a further embodiment of the present invention.
Figure 7B:
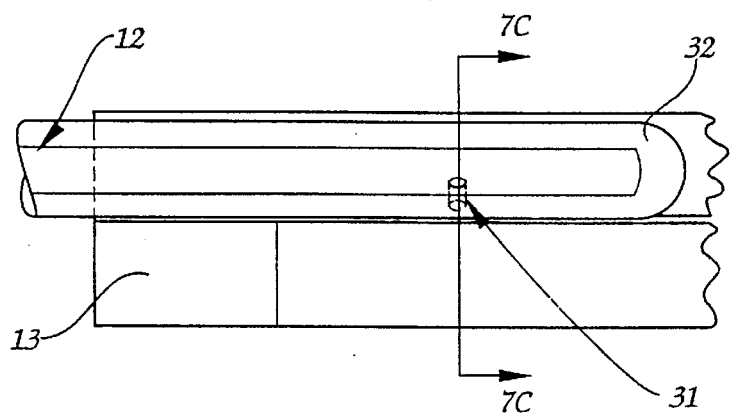
Figure 7C:
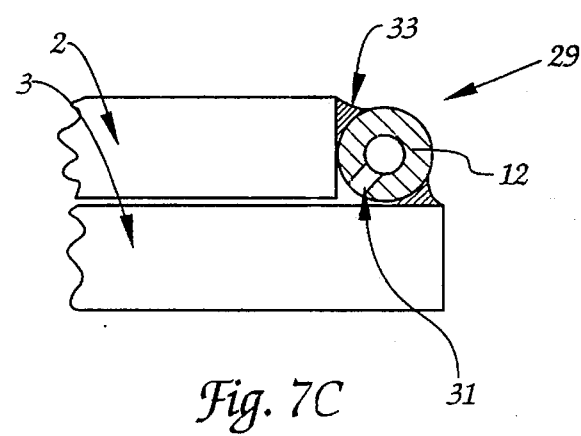

In FIGS. 7a, 7b and 7c, one of the sheets of glass 2 has a portion of its edge near one corner cut away to provide a recess 29 for tube 12. (Alternatively sheet 3 is made larger.) The apex of corner 13, as before, is cut away. Solder glass is pre-deposited onto both pieces of glass in the normal way, except that a small length along the recess is not coated to create a gap 30 in peripheral seal 4. A small aperture 31 is made through the wall of the pump-out tube 12 and one end 32 of the tube is sealed by conventional techniques. The pump-out 12 tube is then positioned into recess 29 with aperture 31 facing inwards towards the gap 30 in the solder glass. More solder glass 33 is then deposited along the exposed edges where pump-out tube 12 contacts the glass sheets 2 and 3. After melting the solder glass, a leak-free seal is made around the entire perimeter of the panel, and between the pump-out tube and the edges of the panel around gap 30 and aperture 31. A passage remains in communication from the exterior, through tube 12 and aperture 31, and through gap 30 in the edge seal, to the interior of the panel. Reduction of pressure inside the panel is effected through this passage. Again, after the panel has been constructed tube 12 is sealed and tipped-off so that it does not extend beyond the nominal dimension of the panel.

Figure 8:
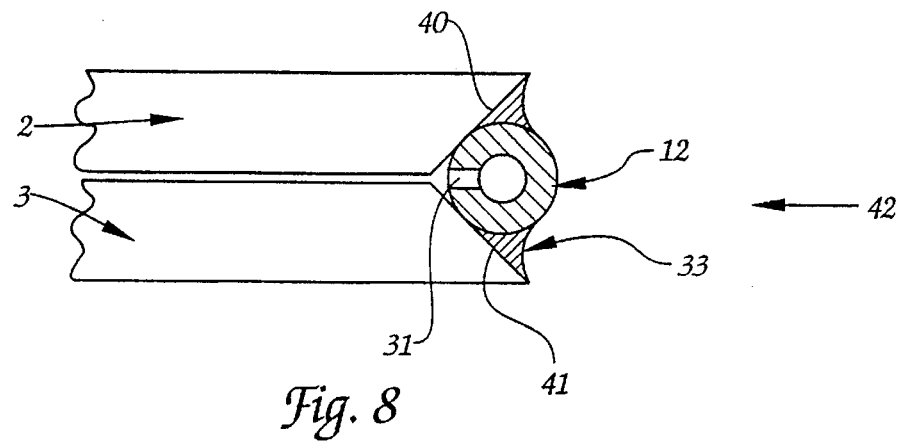
FIG. 8 is a fragmentary elevation of another embodiment of the present invention.

An alternative arrangement which also provides a passage through a gap in the peripheral edge seal is shown in FIG. 8. In this design a portion 40 and 41 of two adjacent edges of glass sheets 2 and 3 are bevelled to create a recess 42. This recess provides a geometrically stable space in which the pump-out 12 can be located during the edge sealing operation. An advantage of this arrangement is that a larger diameter pump-out 12 may be used without extending beyond the nominal thickness of the panel.

A feature of all these arrangements is that tube 12 extends away from the panel into the space where the removed apex of corner 13 has been taken from. Because the distal end of tube 12 is not in contact with the panel, the tube can be melted and sealed after the evacuation process without applying heat to the panel itself. At the same time the sealed end of the tube need not extend beyond the nominal external dimensions of the panel. If desired, the stub of the tube may be further protected by encapsulation in a suitable material.

An advantage of the embodiment shown in FIG. 7 is that no machining need be performed on the glass sheets.

Figure 6B:
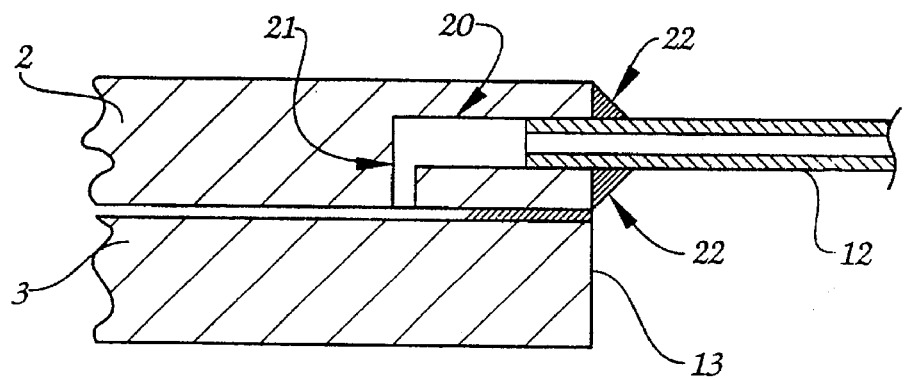
Figure 6C:
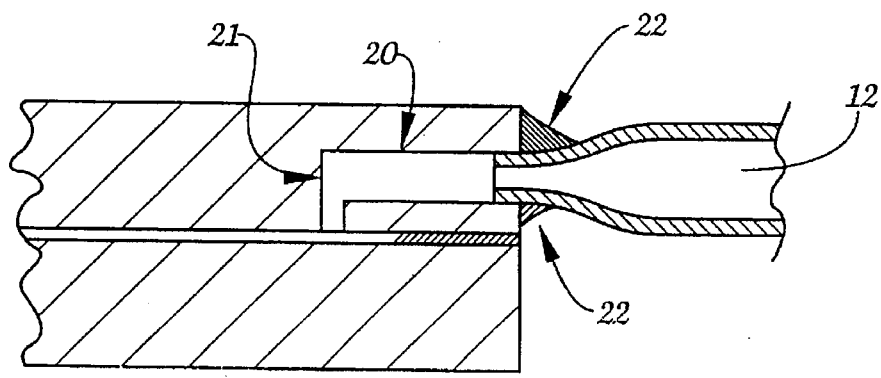

Further, the embodiments of FIGS. 6, 7 and 8 enjoy the advantage that since the mating faces of glass sheets 2 and 3 remain flat, it is a simple matter to make a leak-free seal between them using solder glass.

Figure 4:
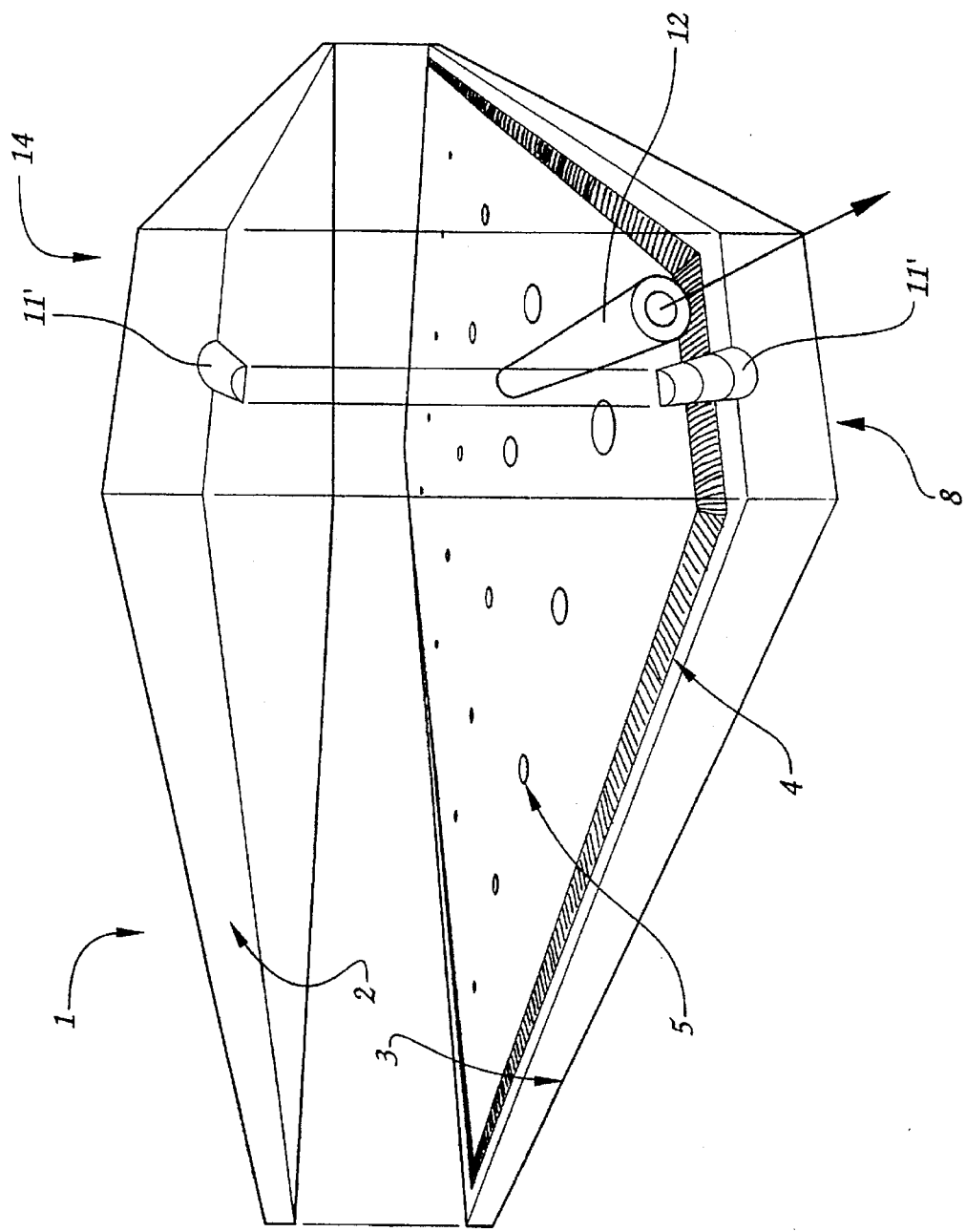
FIG. 4 is a perspective, exploded view of a embodying the present invention.

Leak-free seals between the outer surface of the tube and the surfaces of the glass sheets at the recesses in panels, in the FIGS. 3 and 4 embodiments, are easy to make since a line contact is made between these surfaces. It is also a relatively easy matter to achieve a seal along the gap between the tube and the corner formed where the glass sheets meet, since the panel can be arranged to ensure solder glass flows downwards into this corner during the melting process.

Figure 9:
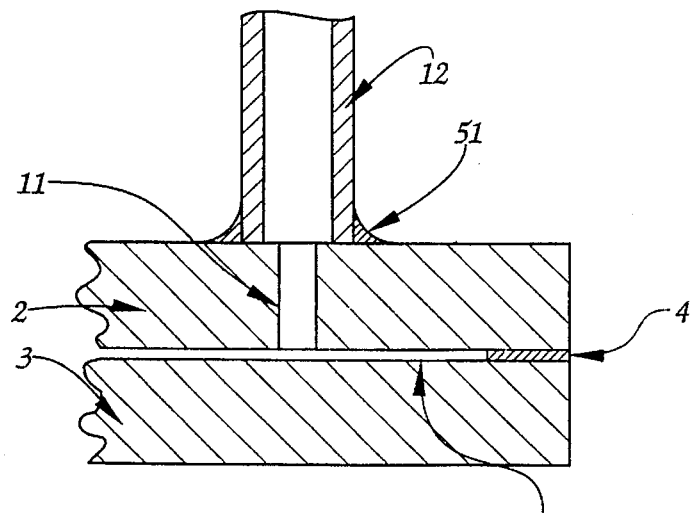
FIG. 9 is a fragmentary sectional view of another embodiment of the present invention.

Another alternative, is to pump through a hole 11 in the face of one of the glass sheets. One arrangement where this is done is illustrated in FIG. 9. A tube 12 is connected to sheet 2 by fusing its end around a pre-machined hole 11 in the glass with solder glass 51. Following the evacuation cycle, the part of tube 12 close to sheet 2 is fused to form a leak-tight seal. This construction clearly has the disadvantage that the stub of the pump-out tube protrudes beyond the nominal thickness of the window.

Figure 10:
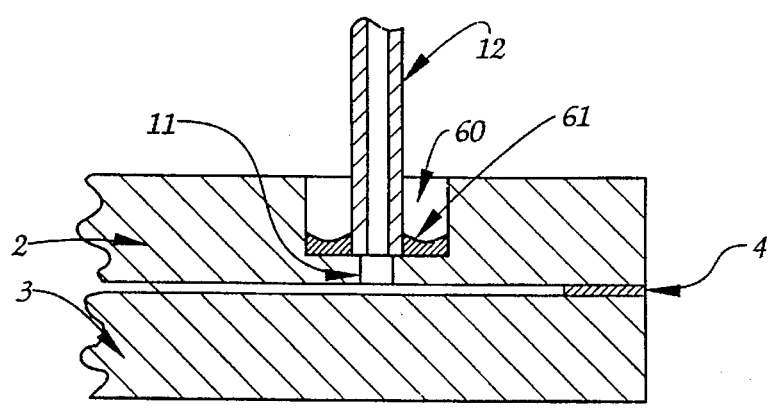
FIG. 10 is a fragmentary sectional view of another embodiment of the present invention.

An alternative arrangement without this disadvantage is shown in FIG. 10. Here, the surface of glass sheet 2 is machined away to form a recess 60 around the external opening of hole 11. Tube 12 is then attached to the bottom of the recess with solder glass 61 leaving a gap between the outside of the tube and the walls of the recess to provide access for a tip-off heater which would leave the end of the stub of tube 12 below the surface of the glass sheet after the sealing and tip-off operation.

In all the construction so-far described, the pump-out tube 12 is connected directly to an evacuation system. An alternative evacuation approach is shown in FIG. 11. Here, a vacuum seal is made between a suction cap 70 and the surface of glass sheet 2 using an O-ring 71 which is resistant to the bake-out temperatures to maintain the seal. The system is evacuated through a hole 11 in the surface of glass sheet 2 which is under the suction cap. Following evacuation, a leak-tight seal is made for the top of hole 11 without breaking the vacuum. An alternative arrangement is to evacuate the space surrounding the entire panel.

There are several possibilities for making such a leak-tight seal. In FIG. 12, for example, the seal is made by soldering a metal, or metallised glass cap 80 onto a pre-metallised area 81 around the hole. Techniques for depositing highly adherent metal coatings to glass are well-known. The use of low melting point solder would enable this sealing operation to be performed with minimal thermal stress in the glass sheet.

An alternative, illustrated in FIG. 13, uses a short glass tube 90, which could be mounted in a recess as shown. This mounting operation is performed with solder glass during the same process for forming the edge seal and support pillars. The distal end of tube 90 is fused inside the suction cap while still under vacuum. This could be achieved with radiative, or conductive heating from within the vacuum by a closely positioned heater. Alternatively, the heating source could be external to the vacuum, with the energy entering the vacuum through a transparent port. A laser, or focussed light source would be particularly appropriate in this case.

We claim:

1. A thermally insulating glass panel, comprising:
   two spaced apart sheets of glass enclosing a low pressure space and interconnected by a peripheral joint of fused solder glass and an array of composite support pillars, said interconnected glass sheets defining a nominal thickness dimension of the panel taken substantially normal to said glass sheets and defining overall nominal lateral dimensions of the panel taken substantially normal to the thickness dimension of the panel, and pump-out means which have been used to provide communication between the low pressure space and the exterior of the panel during the creation of the low pressure space, wherein said pump-out means comprises a pump-out tube, which in the finished state of the glass panel lies within the nominal lateral and thickness dimensions of the panel, and wherein each said composite support pillar comprises a preformed core and a coating of fused solder glass applied to the exterior of said preformed core at least in the areas between said preformed core and said glass sheets.

2. A panel according to claim 1, wherein the pump-out tube passes through a hole extending in the panel between the low pressure space and the exterior.

3. A panel according to claim 1, wherein the pump-out tube is embedded in solder glass in a channel extending through the peripheral joint, said channel being made up from two part-channels each of which is made in a respective one of the two sheets of glass.

4. A panel according to claim 1, wherein the pump-out tube is positioned at the exterior end of a hole extending in the panel between the low pressure space and the exterior, and is attached by solder glass.

5. A panel according to claim 4, wherein the hole passes from an interior face of one of the sheets to an edge of that sheet.

6. A panel according to claim 4, wherein the hole comprises a gap in the peripheral joint of fused solder glass.

7. A panel according to claim 4, wherein the hole passes from an interior face of one of the sheets to the bottom of a recess in an exterior face of that sheet.

8. A panel according to claim 7, wherein the stub of the pump-out tube is below the level of the outer surface of the glass sheet.

9. A panel according to claim 1, wherein one of the sheets of glass has a portion of its edge removed to provide a recess within the nominal dimensions of the glass panel to accommodate the pump-out tube.

10. A panel according to claim 9, wherein a portion of the edges of one or both sheets of glass is bevelled to provide the recess.

11. A panel according to claim 9, wherein the tube is embedded in solder glass in the recess.

12. A panel according to claim 1, wherein the pump-out tube is positioned at a corner of the panel, and the apex of the corner is removed to accommodate the stub of the pump-out tube such that it does not protrude beyond the nominal dimensions of the panel.

13. A panel according to claim 1, wherein each said preformed core of each said composite support pillar is completely coated with a layer of solder glass, each said preformed core of each said composite support pillar is made of a material selected from the group consisting of glass, ceramic, and metal, and each said preformed core of each said composite support pillar has a comparatively small volume in relation to the composite support pillar.

14. A panel according to claim 13, further comprising thin coatings of solder glass applied to each sheet of glass in the vicinity of said composite support pillars.

15. A thermally insulating glass panel, comprising:
   two spaced apart sheets of glass enclosing a low pressure space and interconnected by a peripheral joint of fused solder glass and an array of composite support pillars, each composite support pillar comprising a preformed core and a coating of fused solder glass applied to the exterior of said preformed core at least in the areas between said preformed core and said glass sheets.

16. A panel according to claim 1, wherein each said preformed core of each said composite support pillar is completely coated with a layer of solder glass.

17. A panel according to claim 1, wherein each said preformed core has a solder glass caps at its top and bottom for contact with said glass sheets.

18. A panel according to claim 16, wherein said preformed core is made of material selected from the group consisting of glass, ceramic, and metal.

19. A panel according to claim 18, wherein said preformed cores are made of the same materials as said glass sheets.

20. A panel according to claim 18, wherein each said preformed core has a comparatively small volume in relation to its respective said composite support pillar.

21. A panel according to claim 20, wherein each said composite support pillar has a lateral dimension which is substantially larger than that of its preformed core.

22. A panel according to claim 18, wherein each said preformed core has a comparatively small volume in relation to its composite support pillar and serves to define the height of the composite support pillar, said solder glass coating of the composite support pillar defining the lateral dimension of the composite support pillar.

23. A panel according to claim 18, wherein said preformed cores are adapted to contribute only a small amount to the overall mechanical strength of said composite support pillars after fabrication of the panel.

24. A panel according to claim 18, further comprising this coatings of solder glass applied to each sheet of glass in the vicinity of said composite support pillars.

25. A panel according to claim 18, wherein said preformed cores comprise a configuration of one of the group of cylindrical, spherical, and elliptical.

26. A panel according to claim 18, wherein the ends of each said composite support pillar in contact with said glass sheets extend a distance beyond the diametrical dimension of the middle of said support pillar to define a wetted region.

27. A panel according to claim 26, further comprising a thin film of solder glass disposed between each said support pillar and said glass sheets for increasing the extent of said wetted region formed by said solder glass coating of each said composite support pillar.

* * * * *

UNITED STATES PATENT AND TRADEMARK OFFICE
CERTIFICATE OF CORRECTION

PATENT NO. : 5,657,607
DATED : August 19, 1997
INVENTOR(S) : Richard Edward Collins and Stephen James Robinson It is certified that error appears in the above-identified patent and that said Letters Patent is hereby corrected as shown below:

Column 1, line 22, delete "surfaces" and insert -- surface --

Column 2, line 17, delete "pump out" and insert -- pump-out --

Column 2, line 42, before "comprise" insert -- may --

Column 2, line 63, before "exterior" insert -- the --

Column 3, line 11, please delete "top" and substitute therefor -- to --

Column 3, line 27, after "exact" insert -- value depends on the nature of the interactions between the --

Column 3, line 34, after "solder" insert -- glass --

Column 3, line 39, delete "pillars" and insert -- pillar --

Column 3, line 41, delete "brings" and insert -- bringing --

Column 3, line 51, delete "pillar" and insert -- pillars --

Column 3, line 66, delete "sheets" and insert -- sheet --

UNITED STATES PATENT AND TRADEMARK OFFICE
CERTIFICATE OF CORRECTION

PATENT NO. : 5,657,607

DATED : August 19, 1997

INVENTOR(S) : Richard Edward Collins and Stephen James Robinson

It is certified that error appears in the above-identified patent and that said Letters Patent is hereby corrected as shown below:

Column 4, line 32, delete "than" and insert -- then --

Column 4, line 50, after "a" insert -- panel --

Column 4, line 56, after "plan" insert -- and --

Signed and Sealed this

Fifteenth Day of December, 1998

Attest:

Attesting Officer

BRUCE LEHMAN

Commissioner of Patents and Trademarks